United States Patent [19]

Worms et al.

[11] Patent Number: 5,513,471
[45] Date of Patent: May 7, 1996

[54] PLASTIC SECTIONAL SHELTER

[75] Inventors: Gerard W. Worms, Pilger; Percy A. Eggerman, Watson, both of Canada

[73] Assignee: Poli-Shelters Inc., Atikokan, Canada

[21] Appl. No.: 159,570

[22] Filed: Dec. 1, 1993

[51] Int. Cl.[6] .................................................. E04H 1/12
[52] U.S. Cl. ............................ 52/82; 52/90.1; 52/588.1; 52/582.1; 52/489.1; 403/338; 403/321
[58] Field of Search ......................... 52/82, 90.1, 588.1, 52/582.2, 489.1; 135/87, 124, 906; 403/335, 338, 321

[56] References Cited

U.S. PATENT DOCUMENTS

| | | | |
|---|---|---|---|
| 2,135,437 | 11/1938 | Bangert | 52/82 |
| 3,661,410 | 5/1972 | Larson et al. | 52/582.2 X |
| 3,924,367 | 12/1975 | Stewart | 52/82 X |
| 3,932,976 | 1/1976 | Steel . | |
| 3,999,337 | 12/1976 | Tomassetti, Jr. et al. | 52/82 |
| 4,665,664 | 5/1987 | Knight | 52/82 X |
| 4,672,779 | 6/1987 | Boyd | 52/82 X |
| 4,784,172 | 11/1988 | Yacoboni | 135/87 |
| 4,848,046 | 7/1989 | Wallhead | 52/82 X |
| 5,033,243 | 7/1991 | Worms et al. | 52/82 X |
| 5,083,410 | 1/1992 | Watson . | |
| 5,319,904 | 6/1994 | Pascoe | 52/82 |

FOREIGN PATENT DOCUMENTS 2056518  3/1981  United Kingdom .

Primary Examiner—Carl D. Friedman
Assistant Examiner—Wynn E. Wood
Attorney, Agent, or Firm—Murray E. Thrift; Adrian D. Battison

[57] ABSTRACT

A sectional shelter is made of a set of panels of plastic material arranged side by side, along with a plastic roof cap. The panels are coupled by ribs projecting from one edge portion of each panel and a channel along the other edge portion. Retainers are pivotally mounted on the inside of the wall adjacent the channeled edge portion so that the edge portion carrying the ribs may be captured between the inside wall of the panel and the retainer. The shelter has curved and straight panels so that it may have various configurations. Door and window openings are formed in the wall panels and are closed by doors and windows fastened on the panels.

8 Claims, 9 Drawing Sheets

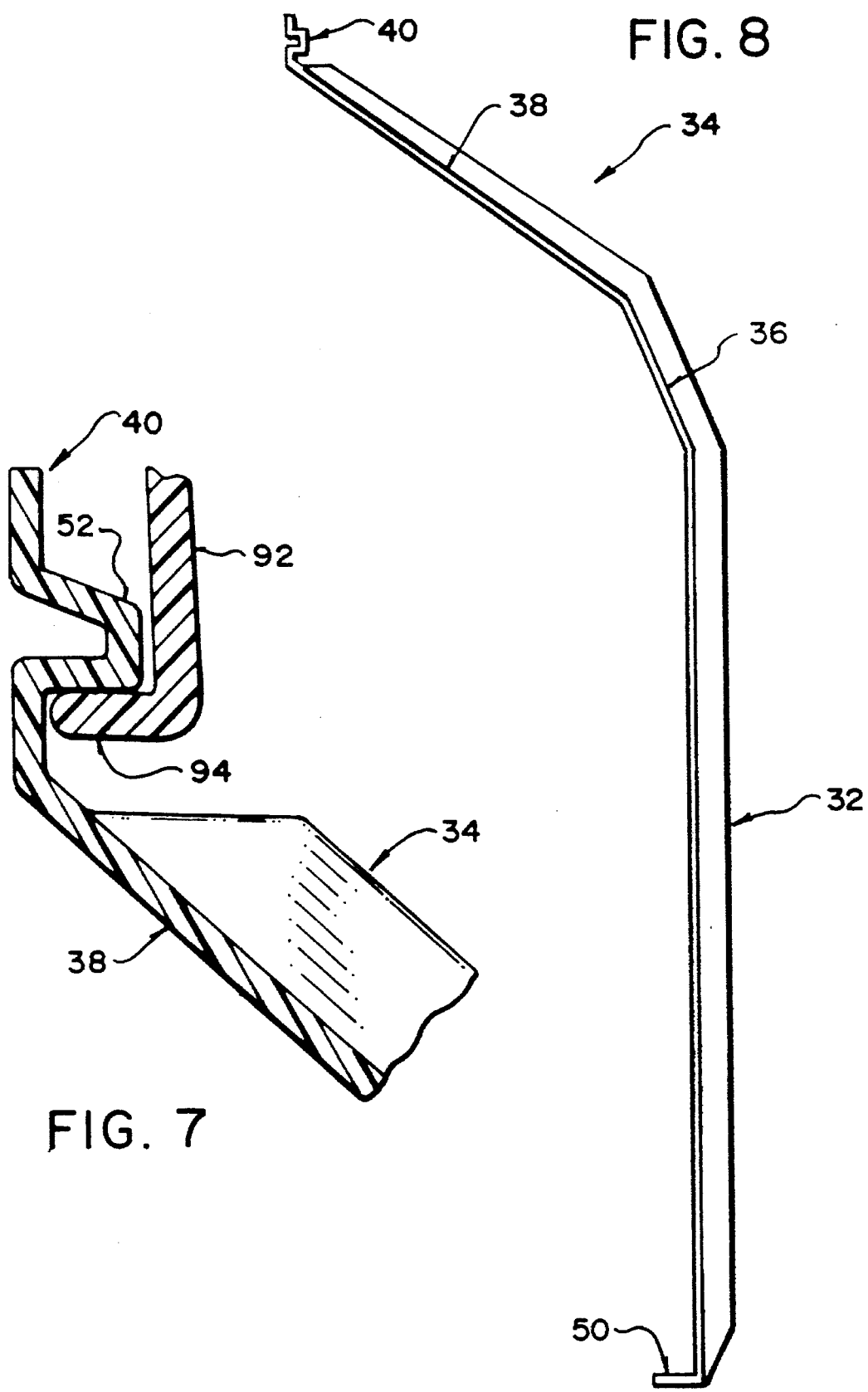

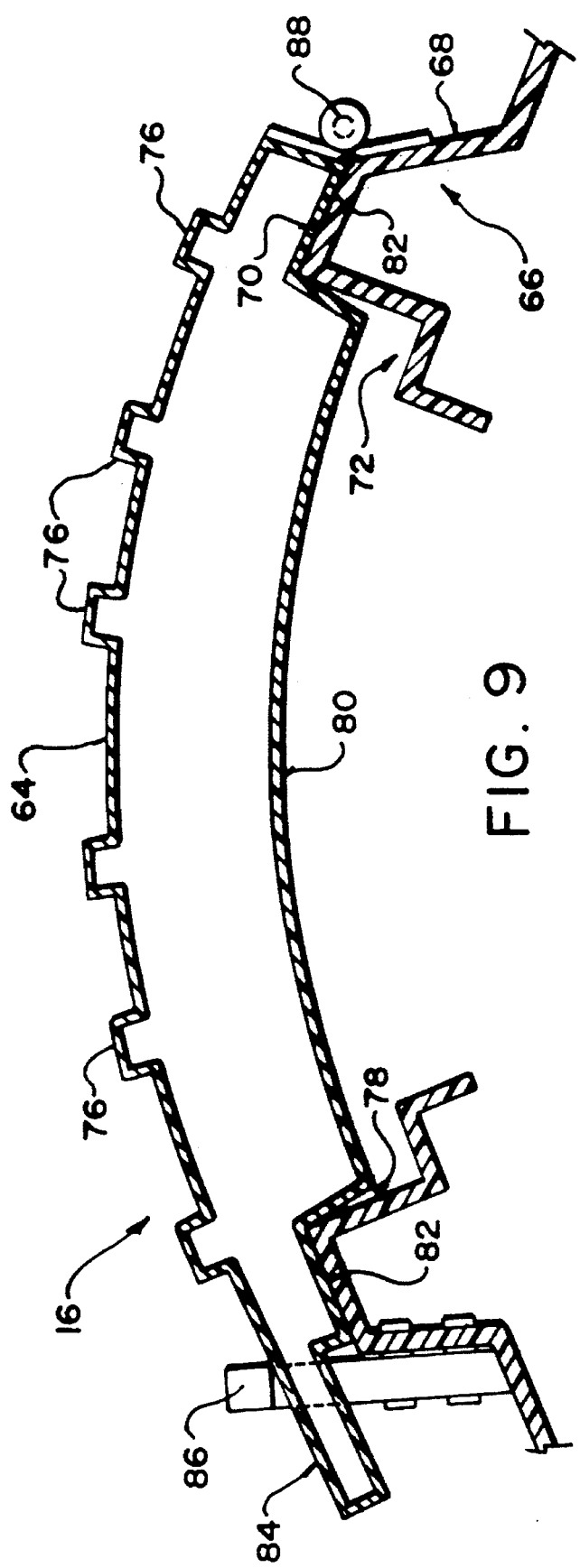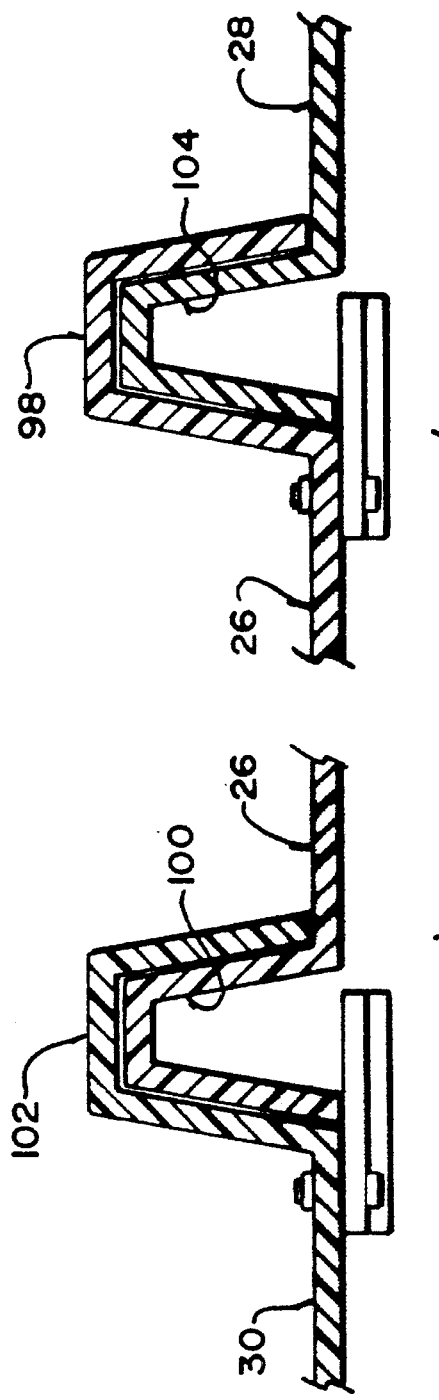

PLASTIC SECTIONAL SHELTER

FIELD OF THE INVENTION

The present invention relates to shelters and more particularly to a knock-down, sectional shelter that is suitable for human accommodation.

BACKGROUND

Various knock-down, sectional shelters are known. They have been constructed in various different configurations for various different uses. One known form of shelter is a dome-like unit used for sheltering the nests for leaf cutter bees in fields of alfalfa and the like where the bees pollinate the crop. The known bee nest shelter is a light weight unit that is not particularly well sealed against the weather. It has an open door, vent holes in the roof cap and joints between panels that are not especially weather tight.

The present invention is concerned with certain improvements in a shelter of this type, making it more suitable for various human uses, for example emergency housing, ice fishing huts, and shelters in remote locations.

SUMMARY

According to one aspect of the present invention there is provided a shelter comprising a plurality of panels of plastic material arranged side by side to form a shelter wall, and coupling means for connecting adjacent walls of the panels, wherein the coupling means comprise first and second edge portions extending along opposite side edges of each panel, male fastener means projecting from an outer face of each panel, along the first edge portion of the panel, female fastener means in an inner face of each panel, along the second edge portion of the panel and being positioned and sized to receive therein the male fastener means of an adjacent panel, and resilient retainer means mounted on the panel adjacent the second edge portion and overlying an inner face thereof for capturing the first edge portion of an adjacent panel between the inner face and the retainer means.

The coupling arrangement provides a more weather tight seal than the external tab system of the bee nest shelter. The preferred fastener means are a rib along one edge of the panel and a channel along the other. Both rib and channel may be channels moulded integrally with the panel.

It is preferred for at least one of the panels to have a door opening and at least one of the panels to have a window opening. A door closes the door opening, and a window comprising a transparent window panel and window mounting frame closes the window opening.

The sealed door and the window are other measures that improve the habitability of the shelter.

According to a further aspect of the present invention there is provided a shelter comprising a plurality of unitary, substantially rigid panels of plastic material, each having opposite side edges and including a lower panel portion and an upper panel portion sloping upwardly from the lower panel portion, each panel including a first coupling means integral with the panel and extending along one side edge of the panel, second coupling means integral with the panel and extending along the opposite side edge of the panel, the first coupling means of each panel being engageable with the second coupling means of each other panel, the panels including corner panels in which the lower panel portions are arcuate segments and side panels in which the lower panel portions are substantially flat, whereby the panels may be secured together into a shelter wall having a lower part with straight and convex segments and an upper part converging to a central opening, and a roof unit of a size larger than the central opening, including a peripheral flange adapted to engage over the upper edges of the assembled panels.

The shelter constructed with straight side panels is larger than the strictly circular unit of the prior art. Using straight panels in both the sides and the ends of the shelter allows the construction of shelters of various different sizes and shapes. The roof component may be produced in segments as well so that a degree of flexibility is also available in this part.

The shelter is readily assembled from its component parts. It is light in weight and can easily be transported in a knocked-down condition.

BRIEF DESCRIPTION OF THE DRAWINGS

In the accompanying drawings, which illustrate an exemplary embodiment of the present invention:

FIG. 7 is a view along line 7—7 of FIG. 2;

FIG. 8 is an edge view of a straight panel;

FIG. 9 is a view along line 9—9 of FIG. 2;

FIG. 10 is a partial longitudinal section of the roof;

DETAILED DESCRIPTION

Figure 1:
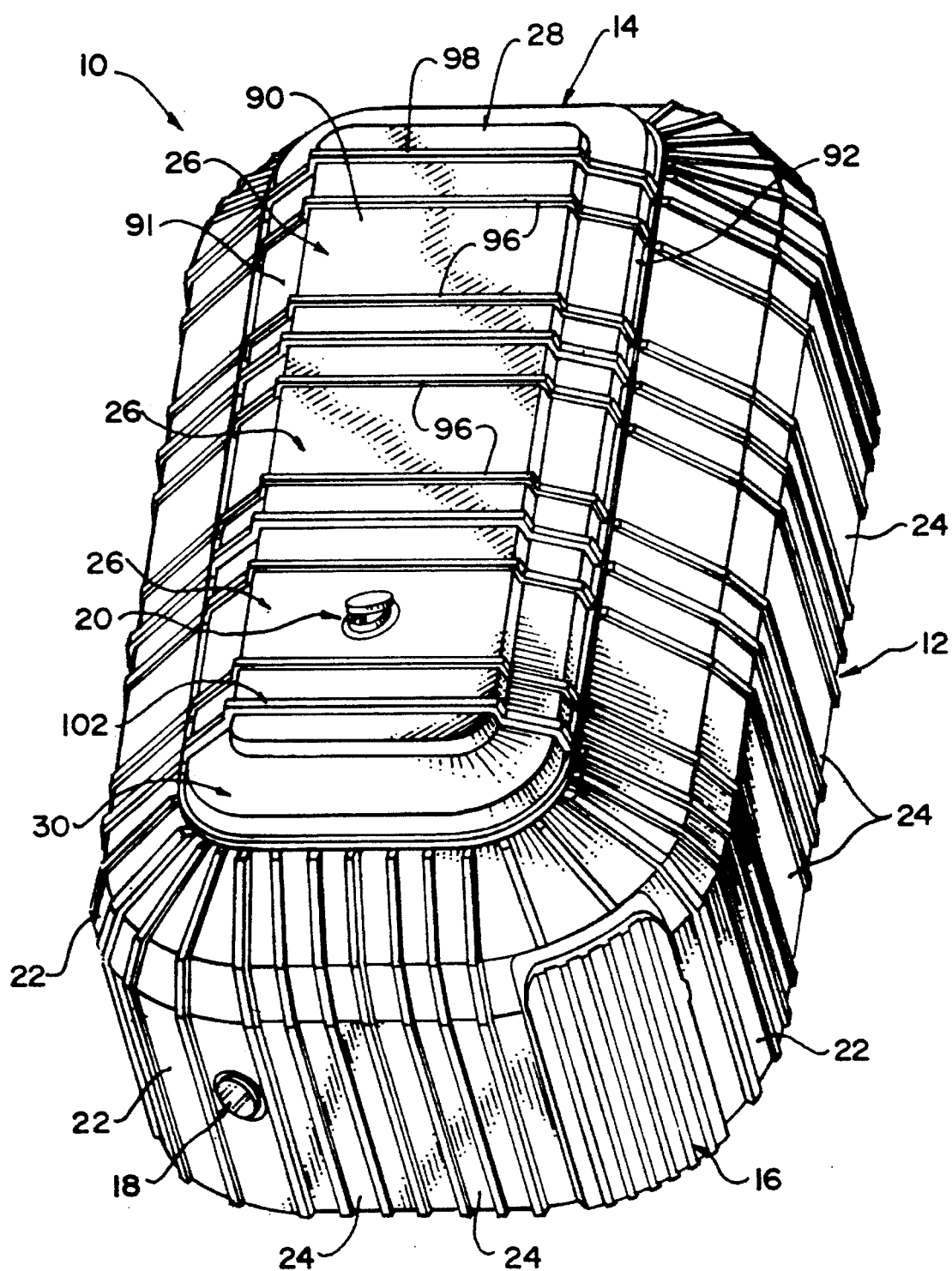
FIG. 1 is an isometric view of a shelter according to the present invention.
Figure 2:
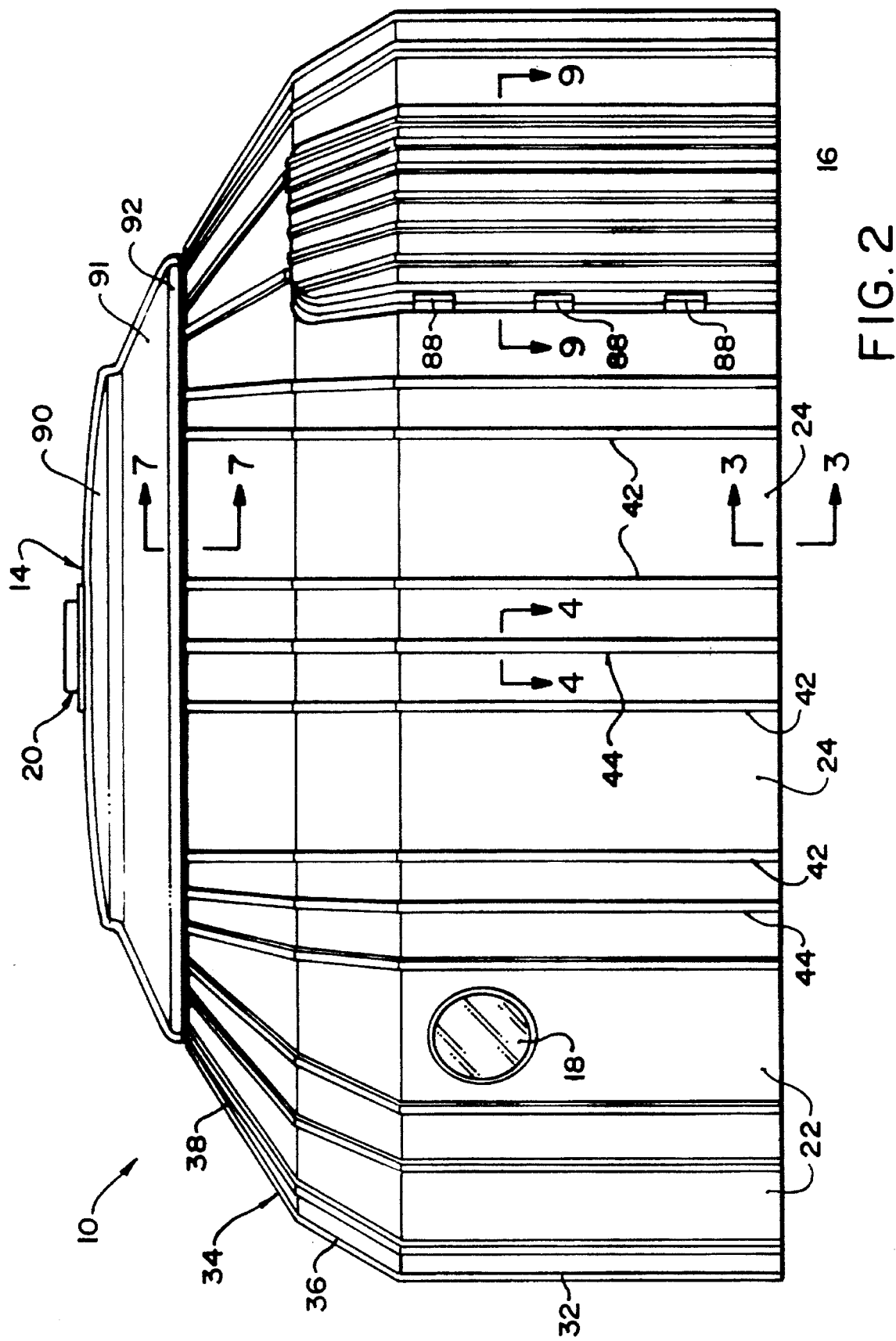
FIG. 2 is an end elevation of the shelter.

Referring to the accompanying drawings, FIGS. 1 through 9 illustrate a shelter 10 having a peripheral wall 12 that slopes upwardly and inwardly to a roof 14. The wall is equipped with a door 16 and a window 18. A roof vent 20 is mounted on the roof.

The illustrated shelter is an elongate shape with straight sides and ends joined by curved corners. Each of the corners is provided by two curved corner panels 22. The rest of the peripheral wall is composed of straight side panels 24, two on each end and three on each side. The roof is made up of three centre panels 26 and two end panels 28 and 30.

The panels 22 and 24 have similar configurations. As shown in FIG. 8, each has an upright lower portion 32 and an inwardly sloping upper portion 34. The upper portion 34 includes intermediate section 36 that slopes upwardly and inwardly from the top edge of the lower portion and top section 38 that slopes upwardly to the centre from the intermediate section, at a greater slope than the intermediate section. At the top of each panel there is an upright flange 40.

Each of the side panels 24 is reinforced with two ribs 42 that extend the full height of the panel, spaced apart between its opposite side edges. A similar third rib 44 extends along one edge of the panel. Each of these ribs is a channel section in profile, opening to the inside of the panel. The third rib thus provides a channel 46 (FIG. 4) along the panel edge, opening to the inside of the panel. A fourth rib 48 extends along the opposite side edge of the panel. This fourth rib is similar in configuration but smaller in cross section than the others and is dimensioned to fit into the open side of the third rib of another, similar panel. The third rib is thus a female rib in the panel coupling system, with the fourth rib being a male rib.

Figure 3:
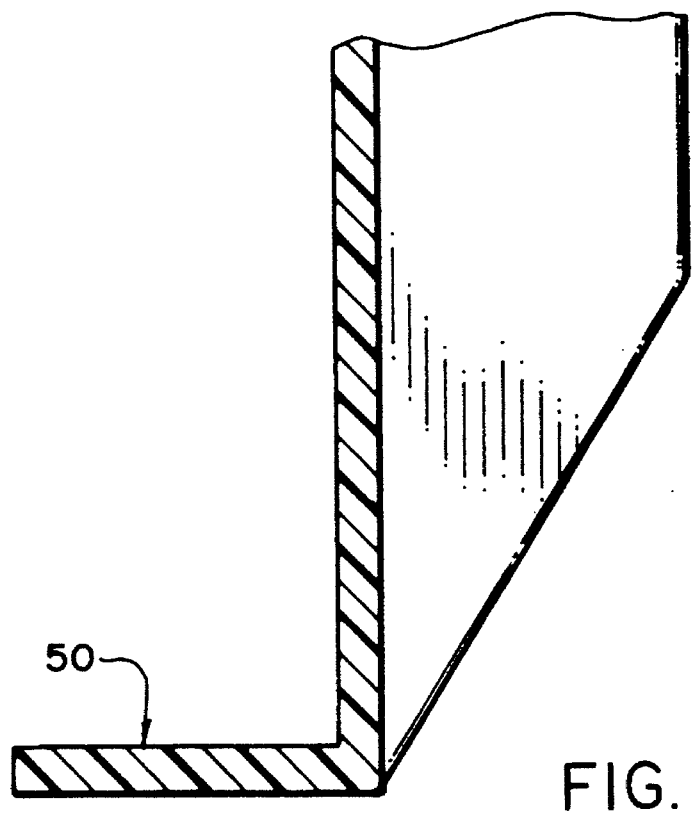
FIG. 3 is a vertical section along line 3—3 of FIG. 2.

As shown in FIGS. 3 and 8, each panel has a horizontal base flange 50 along its bottom edge. As shown in FIGS. 7 and 8, at the top of each panel the flange 40 has a horizontal roof mounting rib 52.

Figure 4:
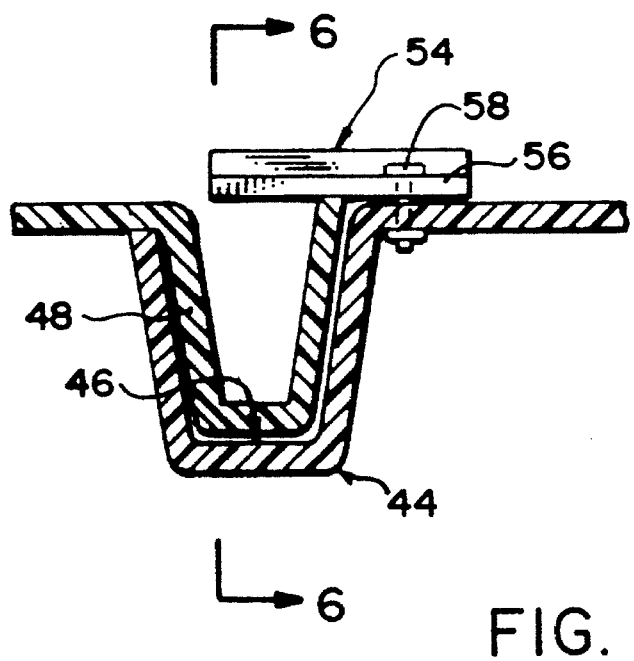
FIG. 4 is a horizontal section along line 4—4 of FIG. 2.
Figure 6:
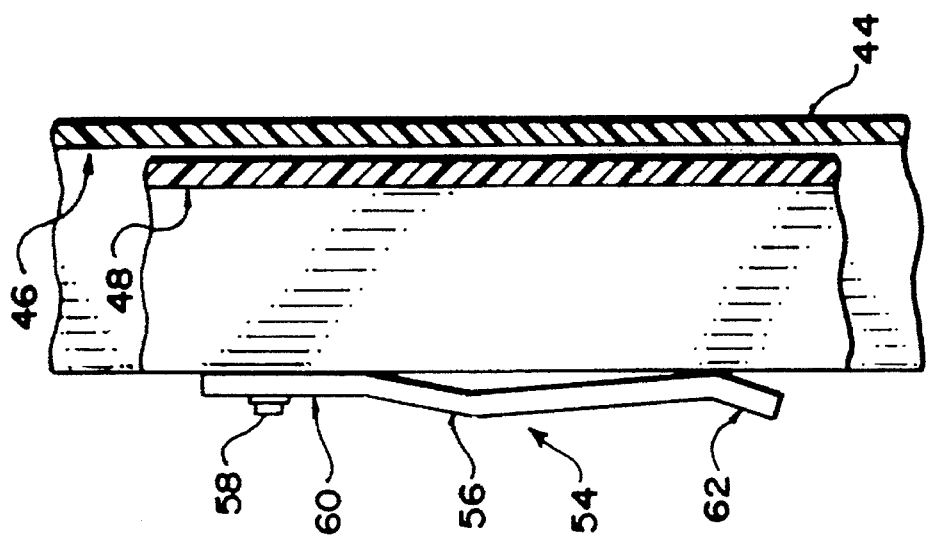
FIG. 6 is a view along line 6—6 of FIG. 4.
Figure 5:
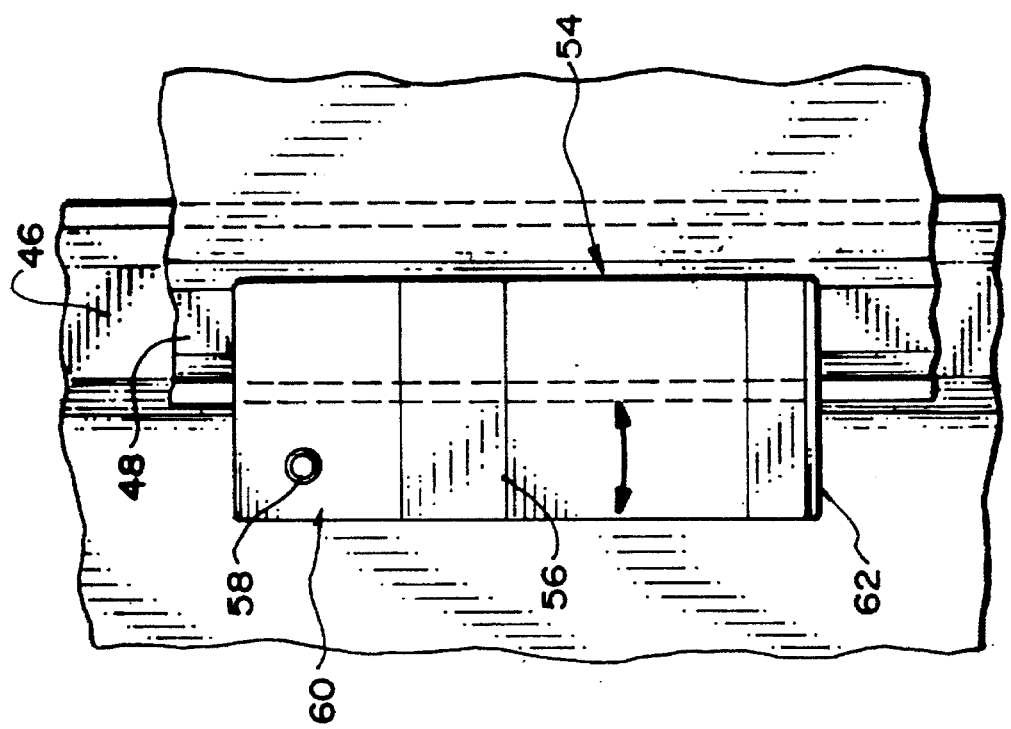
FIG. 5 is an inside view of a panel connection.

Internally, the panel is provided with retainers 54, illustrated most particularly in FIGS. 4, 5 and 6. These are strips 56 of thermoplastic material pivotally mounted on the wall of the panel by rivets 58, adjacent the female rib 44. In use, the retainers extend across the inside of the channel 46 to ensure that the male rib 48 of the next adjacent panel remains captive in the channel. Each retainer strip 56 may be pivoted between an engaged position and a disengaged position. In the disengaged position the channel 46 is unobstructed so that the male rib 48 of an adjacent panel may move into and out of the channel so that the panels may be assembled and disassembled. The retainer plates have offset mounting and retaining ends 60 and 62, and are somewhat resilient so that they provide a firm engagement against the inside of the male rib when engaged in the channel. The nested channel arrangement ensures that the seams between the panels are weather tight.

The door 16 includes a door panel 64 mounted on a door frame 66 moulded integrally into one of the corner panels. As shown in FIG. 9, the frame includes a peripheral rib 68 around the door opening and projecting to the outside of the surrounding panel. The frame has an outer face 70 that follows the contours of the adjacent portions of the panel and a forwardly facing recess 72 around the inside of the face 70. The door panel 64 is a hollow, moulded plastic panel with vertical ribs 76 on its outer face. A peripheral recess 78 is formed in the inner face 80 of the door panel so that the centre of the inner face will project into the door frame recess 72 when the door is closed, with the surrounding face 82 of the door panel in face to face engagement with the outer face 70 of the door frame.

The door panel has an integrally moulded latch projection 84 on one side. This engages a hook-shaped latch tab 86 fastened to the door frame. The side of the door opposite the projection 84 is mounted on the door frame by hinges 88.

The top of the shelter is closed with the roof 14. This includes a centre part 90 surrounded by a sloping panel 91 extending beyond the wall panel flanges 40 and a peripheral skirt 92 that extends over the outside of the flanges 40. The cap is secured in place using the ribs 52 on the flanges 40 and a lip 94 projecting inwardly from the bottom of the skirt to engage under the ribs 52 (FIG. 7).

As noted above, the roof is composed of three straight centre panels 26. Each of these is constructed with two lateral reinforcing ribs 96, like the wail ribs 42. As shown in detail in FIG. 10, each panel has, along one edge, a similar female coupling rib 98, while a male coupling rib 100 is formed along the other edge. Of the two end panels 28 and 30, one has a female rib 102, while the other has a male rib 104 to engage opposite edges of a centre panel.

Figure 11:
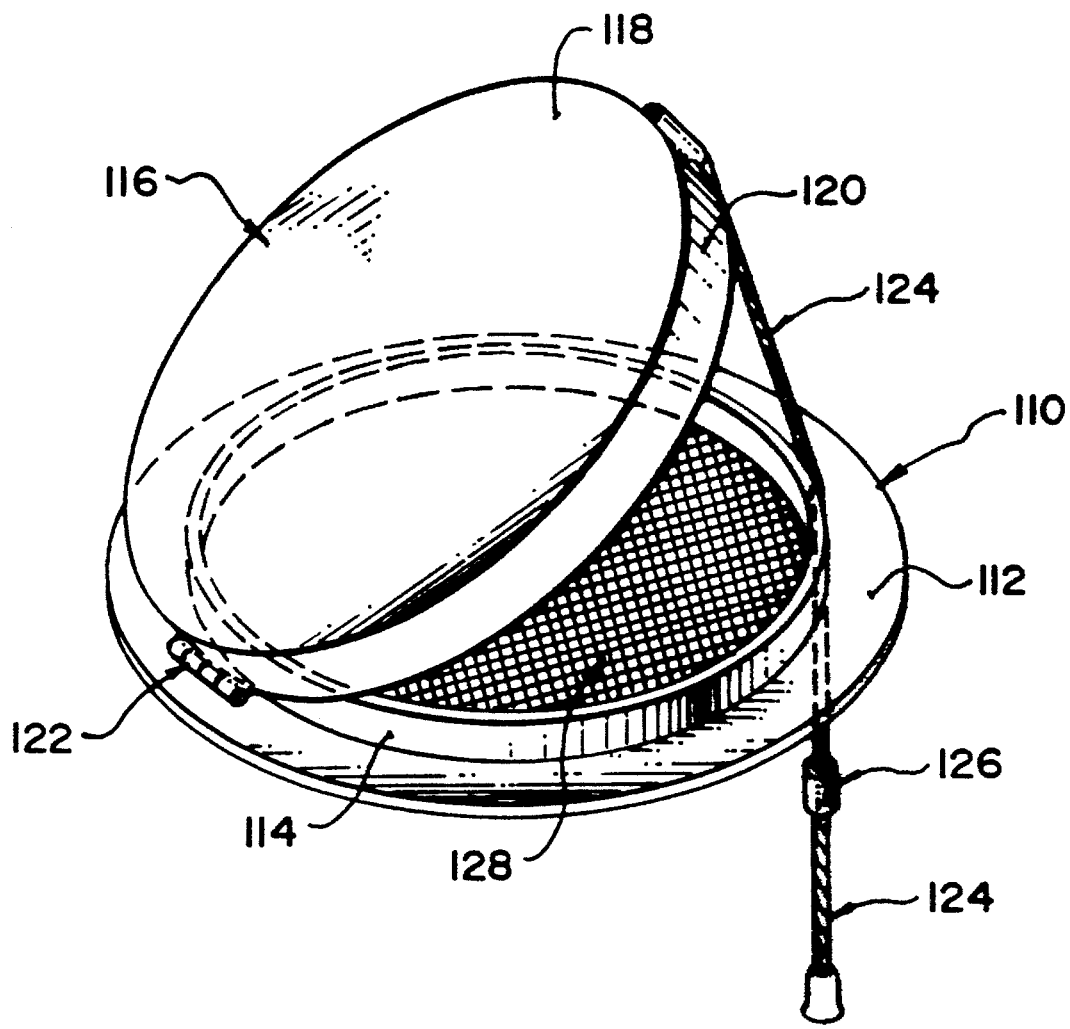
FIG. 11 is a detail of a window.

The shelter window 18 and roof vent 20 are of the same configuration, the only difference is the addition of screening to the window. As illustrated in FIG. 11, each of these units has an annular frame 110 with a peripheral mounting skirt 112 that fastens to the shelter wall or roof with pop rivets. A cylindrical flange 114 projects to the outside from the mounting skirt. A cap-like cover 116, with a centre panel 118 and a surrounding flange 120 is mounted on the frame by a spring-loaded hinge 122. The spring biases the cover to the open position. To close the cover, a line 124 extends from the cover, through an opening in the frame 110, to the inside of the shelter. A stop 126 is adjustably positioned on the line 124 and limits the opening of the cover when it engages the frame on the inside. The window is completed with a screen 128.

Figure 12:
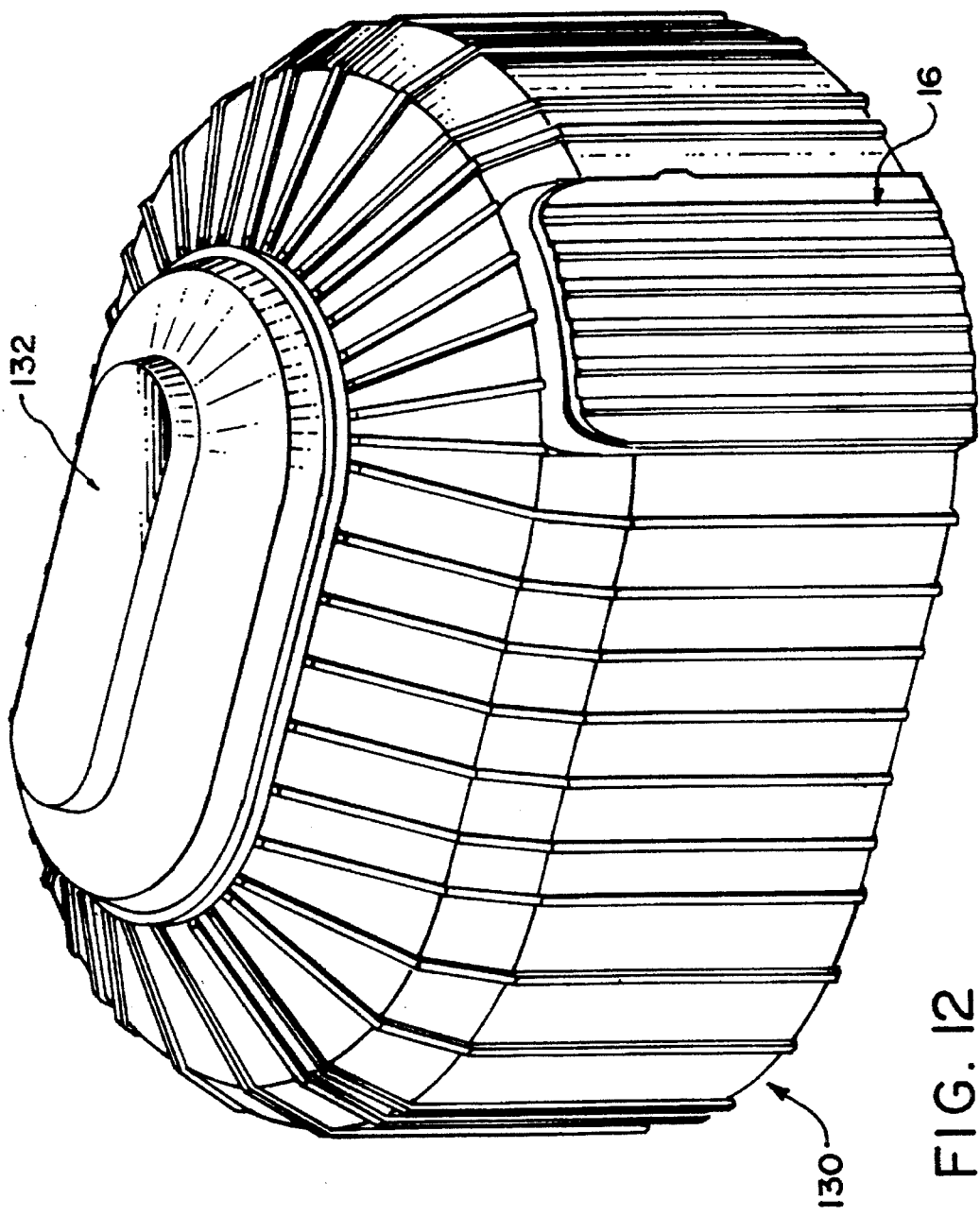
FIG. 12 is an isometric view of a second embodiment of the shelter.

While one embodiment of the present invention has been described in the foregoing, it is to be understood that other embodiments are possible within the scope of the invention. Thus, for example, different combinations of the flat and curved panels may be assembled to provide shelters of various shapes. FIG. 12 illustrates an oval shelter 130 with rounded ends composed of corner panels. A single straight panel is used in each side. A unitary roof cap 132 is used in this embodiment.

Figure 13:
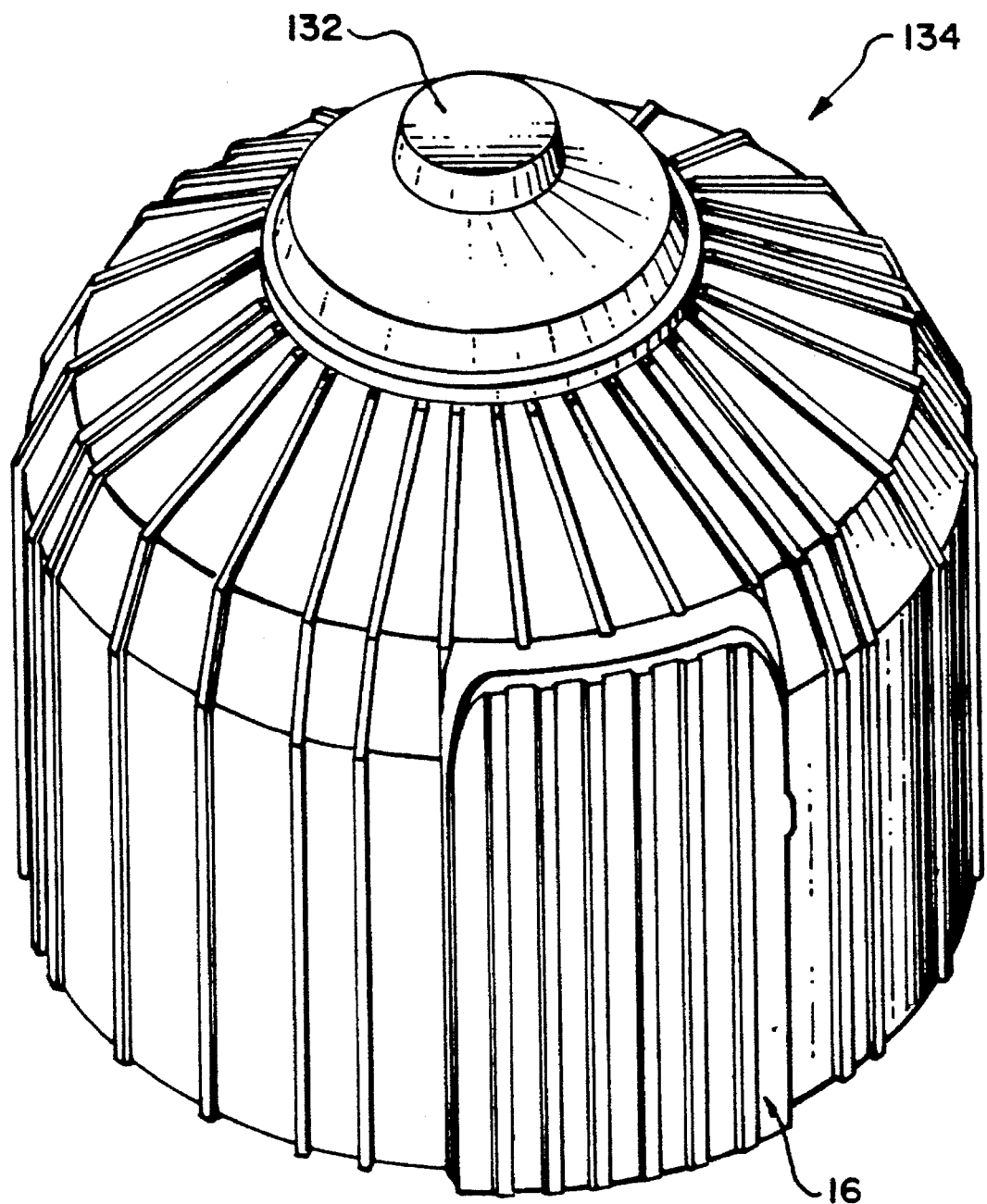
FIG. 13 is an isometric view of a third embodiment of the shelter.

Another embodiment of the shelter is illustrated in FIG. 13. In that embodiment, the shelter 134 is round and is composed of corner panels only. A circular roof cap 136 is used.

The invention is not to be considered limited to the illustrated embodiments, as other embodiments are possible without departing from the invention disclosed herein. The invention is to be considered limited solely by the scope of the appended claims.

We claim:

1. A shelter comprising a plurality of panels of plastic material arranged side by side to form a shelter wall, and coupling means connecting adjacent panels, wherein:

each panel comprises:
        inner and outer faces; and
        first and second edge portions extending along opposite side edges of the panel; and
    the coupling means comprise, for each panel;
        male fastener means projecting from the outer face of the panel, along the first edge portion of the panel,
        female fastener means extending into the inner face of the panel, along the second edge portion of the panel and being positioned and sized to receive therein the male fastener means of an adjacent panel, and
        resilient retainer means mounted on the inner face of the panel adjacent the second edge portion, overlying the second edge portion and capturing the first edge portion of an adjacent panel between the inner face and the retainer means.

2. A shelter according to claim 1 wherein, for each panel, the retainer means comprise at least one resilient plastic strip and means securing the strip to the panel.

3. A shelter comprising a plurality of panels of plastic material arranged side by side to form a shelter wall, and coupling means connecting adjacent panels, wherein:

each panel comprises:
        inner and outer faces; and
        first and second edge portions extending along opposite side edges of the panel; and
    the coupling means comprise, for each panel;
        male fastener means projecting from the outer face of the panel, along the first edge portion of the panel,
        female fastener means extending into the inner face of the panel, along the second edge portion of the panel and being positioned and sized to receive therein the male fastener means of an adjacent panel, and resilient retainer means comprising a plurality of resilient plastic strips, each pivotally mounted on the inner face of the panel adjacent the second edge portion and overlying the second edge portion for movement between a disengaged position in which the second edge portion of the panel is unobstructed by the strip and an engaged position extending across the second edge portion and capturing the first edge portion of an adjacent panel between the inner face and the retainer means.

4. A shelter according to claim 1 wherein, for each panel, the male fastener means comprise a rib along the first edge of the panel, projecting from the outer face of the panel and the female fastener means comprise a channel along the second edge of the panel, opening to the inner face of the panel.

5. A shelter according to claim 4 wherein, for each panel, the rib and the channel are moulded integrally with the panel.

6. A shelter according to claim 5 wherein the rib is a second channel, smaller than the channel of the female fastener means.

7. A shelter according to claim 1 wherein at least one of the panels has a door opening therein and at least one of the panels has a window opening therein, and further comprising a door for closing the door opening, the door including a door panel and means for mounting the door panel on the associated panel for selectively closing the door opening, and a window comprising a transparent window panel and window mounting means mounting the window panel in the window opening.

8. A shelter according to claim 7 including latch means for holding the door in a closed condition.

* * * * *